United States Patent
Bronfeld et al.

(10) Patent No.: US 9,033,668 B2
(45) Date of Patent: May 19, 2015

(54) IMPELLER

(75) Inventors: Yakov Bronfeld, Naale (IL); Savely Khosid, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 474 days.

(21) Appl. No.: 13/461,087

(22) Filed: May 1, 2012

(65) Prior Publication Data

US 2013/0115067 A1     May 9, 2013

(30) Foreign Application Priority Data

May 5, 2011 (IL) .......................................... 212729

(51) Int. Cl.
| | |
|---|---|
| F01D 13/00 | (2006.01) |
| F04D 19/00 | (2006.01) |
| F01D 5/06 | (2006.01) |
| F01D 5/14 | (2006.01) |
| F02C 3/04 | (2006.01) |
| F02K 3/06 | (2006.01) |
| F04D 17/02 | (2006.01) |
| F04D 29/28 | (2006.01) |
| F04D 29/32 | (2006.01) |

(52) U.S. Cl.
CPC ................ *F04D 19/002* (2013.01); *F01D 5/06* (2013.01); *F01D 5/142* (2013.01); *F02C 3/04* (2013.01); *F02K 3/06* (2013.01); *F04D 17/025* (2013.01); *F04D 29/284* (2013.01); *F04D 29/321* (2013.01); *Y02T 50/673* (2013.01)

(58) Field of Classification Search
CPC ... F04D 29/284; F04D 29/324; F04D 29/329; F04D 13/12; F04D 17/12; F04D 19/007; F04D 19/002; F04D 19/02; F04D 25/163; F04D 15/166; F04D 29/2211; F01D 1/023; F01D 1/08; F01D 1/20; F01D 1/22; F01D 13/00; F01D 13/02
USPC ................. 416/183, 175–177, 203, 185, 188, 416/223 B; 415/72, 74
See application file for complete search history.

(56) References Cited

U.S. PATENT DOCUMENTS

| | | | | |
|---|---|---|---|---|
| 3,116,908 | A | * | 1/1964 | Wosika .......................... 415/143 |
| 3,937,013 | A | * | 2/1976 | Aspinwall ..................... 60/226.3 |
| 4,093,401 | A | * | 6/1978 | Gravelle ........................ 416/185 |
| 5,105,616 | A | | 4/1992 | Bornemisza |
| 6,663,347 | B2 | * | 12/2003 | Decker et al. .................. 416/185 |
| 6,790,016 | B2 | * | 9/2004 | Chiang ...................... 417/423.1 |
| 7,055,306 | B2 | | 6/2006 | Jones et al. |
| 2010/0254816 | A1 | * | 10/2010 | Dettmann et al. ........ 416/223 A |

* cited by examiner

*Primary Examiner* — Dwayne J White
*Assistant Examiner* — William Grigos
(74) *Attorney, Agent, or Firm* — Ohlandt Greeley Ruggiero & Perle L.L.P.

(57) ABSTRACT

A combined fan-compressor impeller comprises a single hub and a plurality of spaced main blades extending outwardly from the hub such that an air passage channel is defined between two of the main blades. Each of the main blades is a mixed flow blade which continuously extends from a fan section at an inlet end of a channel to a compressor section at an outlet end of the channel without any axial clearance between the fan section and the compressor section, providing aerodynamic matching of pressurized air flowing through the channel from the fan section to the compressor section.

12 Claims, 4 Drawing Sheets

IMPELLER

FIELD OF THE INVENTION

The present invention relates to the field of turbofan engines and APUs. More particularly, the invention relates to a unified or combined impeller for improving performance characteristics of a turbofan engine and APUs.

BACKGROUND OF THE INVENTION

Small jet engines are widely used in aviation. Among other applications, small jet engines serve as main thrust units for missiles and unmanned air vehicles (UAV's), as auxiliary power units (APUs) for large airborne systems, for example to assist in starting operation of the main engines and in supplying energy for air conditioning systems.

Many small jet engines suffer from poor performance resulting from a low pressure ratio due to limited rotating speed and material strength. The specific fuel consumption (SFC), which is the ratio of fuel that is consumed per time to the thrust that is generated, is conventionally reduced by bypassing a portion of the air introduced to the engine core. The engine core generally comprises a compressor, a combustion chamber in which the compressed air is heated by means of the fuel combustion, a turbine from which the thermal energy of the combustion gases is extracted to drive the compressor, and the exhaust nozzle to provide thrust.

An engine generating a bypass stream of air is called a turbofan engine or a bypass jet engine, and is generally configured with two separate coaxial shafts, in order to match the work output of two compressor units throughout the entire range of their rotational speeds. On each of these shafts are mounted compressor wheels and turbine wheels. A low pressure compressor located immediately after the air intake, generally called a fan, is driven by a low pressure turbine and compresses all of the air introduced to the engine by a compression ratio of 1.5-2.5. One portion of the compressed air is delivered to a high pressure compressor driven by a high pressure turbine and is then directed to the combustion chamber. The combustion gases exiting the combustion chamber cause both turbine wheels to rotate and are then discharged from an exhaust nozzle. The remaining portion of the air compressed by the fan is bypassed through a bypass duct and is mixed in the exhaust section with the core gas flow, although both flows may also be separated to a certain extent. By providing a stream of bypassed air in addition to the core gas flow, a turbofan engine is able to generate an increased level of thrust, i.e. the product of velocity and mass flow rate, often greater than a turbojet engine, at a decreased velocity, resulting in reduced specific fuel consumption. The velocity of the bypassed air may be designed to be close to the velocity of the core gas. Due to the addition of the bypass duct, the outer diameter of a turbofan engine is larger than a turbojet providing the same thrust.

Prior art turbofan engine configurations, particularly for small, low thrust engines of up to a few hundred N, have serious design limitations in terms of an increased outer diameter in order to accommodate the bypass duct. Such small engines can produce a suitably high level of thrust only at high rotational speeds of up to hundreds of thousand RPM. At such speeds, only small bearings can retain their structural integrity, and therefore the inner shaft is required to also have a small diameter. As a result, the small-diameter shaft has low stiffness and high amplitude of oscillations at critical speeds, leading to a difficulty in preventing contact between the two rotating coaxial shafts.

During normal operation of a prior art turbofan engine, the slightly compressed air exiting the fan is directed to stator vanes located between the fan and the compressor. These expensive to manufacture stator vanes are adapted to guide the airflow to the compressor and to perform aerodynamic matching, i.e. causing the velocity vector, which is dependent upon the velocity and angle, of the airflow exiting the fan to change to a suitable velocity vector at the inlet of the compressor which prevents flow separation from the compressor blades. During those situations when the fan is subjected to a relatively high load, e.g. in order to generate a relatively high pressure ratio, two rows of guide vanes are usually required, further increasing costs.

When a one-spool engine configuration is employed, the engine optimally operates at a single designed working point; however, when working at off-design points, the relation between airflow velocity and inlet angle is not optimal. In order to operate optimally with respect to off-design points, it is necessary to install variable-angle guide vanes, or to perform air bleeding between the fan and compressor.

Another disadvantage associated with the use of guide vanes is that a boundary layer is being developed at the leading edge of the vane upon introduction of the airflow to the guide vane. Since the majority of friction losses are related to the developing thin boundary layer, each row of guide vanes causes additional fluid energy losses.

It would therefore be desirable to provide a new turbofan engine configuration that could overcome these drawbacks.

Various lightweight and low cost turbofan engine configurations have been proposed in the prior art.

U.S. Pat. No. 3,937,013 discloses a bypass type jet propulsion engine that includes a core engine with a centrifugal compressor and a centripetal turbine connected coaxially back-to-back and combustion apparatus disposed radially outwardly of the turbine. The fan part of the engine is provided by fan blades extending outwardly from the rotor blades of the core engine compressor which discharge through outlet guide vanes into a fan duct lying radially outwardly of the combustion apparatus. The fan outlet guide vanes are variable to substantially close the fan duct for starting the engine. Part of the air flows from the compressor to the combustion apparatus of the core engine through hollow turbine nozzle vanes. In order to accommodate the large radius centrifugal compressor, the bypass duct is configured with sharp turns of close to 90 degrees, leading to large fluid energy losses.

U.S. Pat. No. 5,105,616 discloses a gas turbine engine comprising a centrifugal compressor with radially inner, high pressure blades and radially outer, low pressure blades in order to provide bypass air and to maximize combustion efficiency. Variable guide vanes selectively occlude the entrance ends of the low pressure blades. In addition to the outer contour with sharp turns that leads to high fluid energy losses and a reduction in thrust generation, the configuration of this engine also generates two aerodynamically separated flows, one for each set of compressor blades. The two flows are at different velocities and pressures, reducing the aerodynamic performance of the engine.

In the turbofan engine of U.S. Pat. No. 7,055,306, a combined stage rotor is mounted for common rotation with a shaft, a centrifugal compressor stage, and a turbine stage as a single unitary wheel. Each of the plurality of fan blades of the combined stage rotor for communicating incoming airflow through the fan bypass duct are contiguous with a respective compressor blade for communicating airflow through the core duct. The combined stage rotor is located at a junction between the fan bypass duct and the core duct. Although the combined stage rotor increases fuel efficiency and thrust to allow the turbofan engine to be used for single usage applications, the fan and compressor stages are nevertheless separated, leading to aerodynamically separated flows and an increased engine diameter as a result of the use of a centrifugal compressor that radially discharges the compressed air.

It is an object of the present invention to provide an impeller to be used in a turbofan engine or in an APU having an outer diameter which is significantly smaller than that of prior art engines for a given thrust.

It is an additional object of the present invention to provide an impeller with improved aerodynamic matching relative to prior art fans and compressors.

It is an additional object of the present invention to provide an impeller to be used in a turbofan engine or in an APU which does not require any guide vanes between the fan and compressor sections.

Other objects and advantages of the invention will become apparent as the description proceeds.

SUMMARY OF THE INVENTION

The present invention provides a combined fan-compressor impeller, comprising a single hub and a plurality of spaced main blades extending outwardly from said hub, an air passage channel being defined between two of said main blades, wherein each of said main blades is a mixed flow blade which continuously extends from a fan section at an inlet end of a channel to a compressor section at an outlet end of said channel without any axial clearance between said fan section and said compressor section, thereby providing aerodynamic matching of pressurized air flowing through said channel from said fan section to said compressor section.

As referred to herein, "aerodynamic matching" means that said channel is designed to be aerodynamically smooth, i.e. the channel geometry prevents the separation of flow from the channel walls and also prevents the generation of vortices.

Prior art turbofan engines have two stages of air compression with guide vanes between these stages, and also two shafts, resulting in high manufacturing costs due to the complex design. Other prior art turbofan engines have a simpler one-shaft design, also with guide vanes, but suffer from a lack of aerodynamic matching between the fan and compressor stages in off-design working points.

The present invention overcomes these problems by providing a combined air path by virtue of a plurality of main blades, each of which continuously extending from the fan section to the compressor section to produce a single fan-compressor wheel without any stator vanes between the fan and compressor. A one-shaft turbofan engine based on the combined impeller of the present invention has an improved fuel/thrust ratio with respect to a prior art turbofan engine with the same outer diameter employing a centrifugal compressor. The combined mixed flow impeller of the present invention has a smaller diameter than a corresponding centrifugal compressor used by an impeller of the prior art. Thus the difference in volume between the inventive and prior art impellers allows a larger bypass duct to be used, thereby providing a higher bypass ratio and a correspondingly lower fuel/thrust ratio. Alternatively, the same maximum engine thrust may be produced with a smaller outer engine diameter than a conventional one-shaft turbofan having a centrifugal compressor, by using the combined impeller of the present invention.

One portion of pressurized air exits the impeller via a first outlet from a trailing edge of the fan portion leading to a bypass duct. Another portion of pressurized air exits the impeller via a second outlet through a core compressor section end of the channel.

In one aspect, the main blade comprises a fan portion, e.g. curvilinear and trapezoidal, and an elongated compressor portion having a blade height from the hub which is significantly less than that of said fan portion.

In one aspect, the plurality of main blades is axisymmetric with respect to the axis of rotation of the impeller, and each main blade has a twisted configuration.

In one aspect, the fan section has an axial length, i.e. parallel to the longitudinal axis, significantly less than that of the compressor section.

In one aspect, an outlet end of the fan section has an outer diameter significantly greater than the outer diameter of an inlet end of the compressor section.

In one aspect, the hub has a bell shape and terminates with a planar surface at its outlet end or with a non-planar surface, the shape of which is dictated by the needed strength and stiffness for the fan-compressor wheel.

In one aspect, the impeller further comprises one or more splitter blades, each of said splitter blades extending outwardly from the hub and positioned between two adjacent main blades.

In one aspect, the hub and the plurality of main blades and splitter blades are integrally made from a single piece of metal.

DETAILED DESCRIPTION OF PREFERRED EMBODIMENTS

The novel impeller of the present invention comprises a single combined fan-compressor wheel positioned at the engine inlet and arranged such that each fan blade extends smoothly to a corresponding compressor blade without any axial clearance therebetween, obviating the need of stator vanes that are needed in prior art turbofan engines to guide air from the fan to the compressor. While prior art single-shaft fan-compressor sections suffer from a lack of aerodynamic matching due to the clearance between the fan and compressor, requiring guide vanes for providing such matching, at least at the design point, the unified impeller of the present invention which is configured with a plurality of mixed-flow blades provides a continuous aerodynamically smooth air path that leads to a significantly reduced diameter of the combined fan-and-compressor wheel.

FIGS. 1-4 illustrate a novel one-wheel impeller according one embodiment of the present invention, which is generally indicated by numeral 10.

Figure 1:
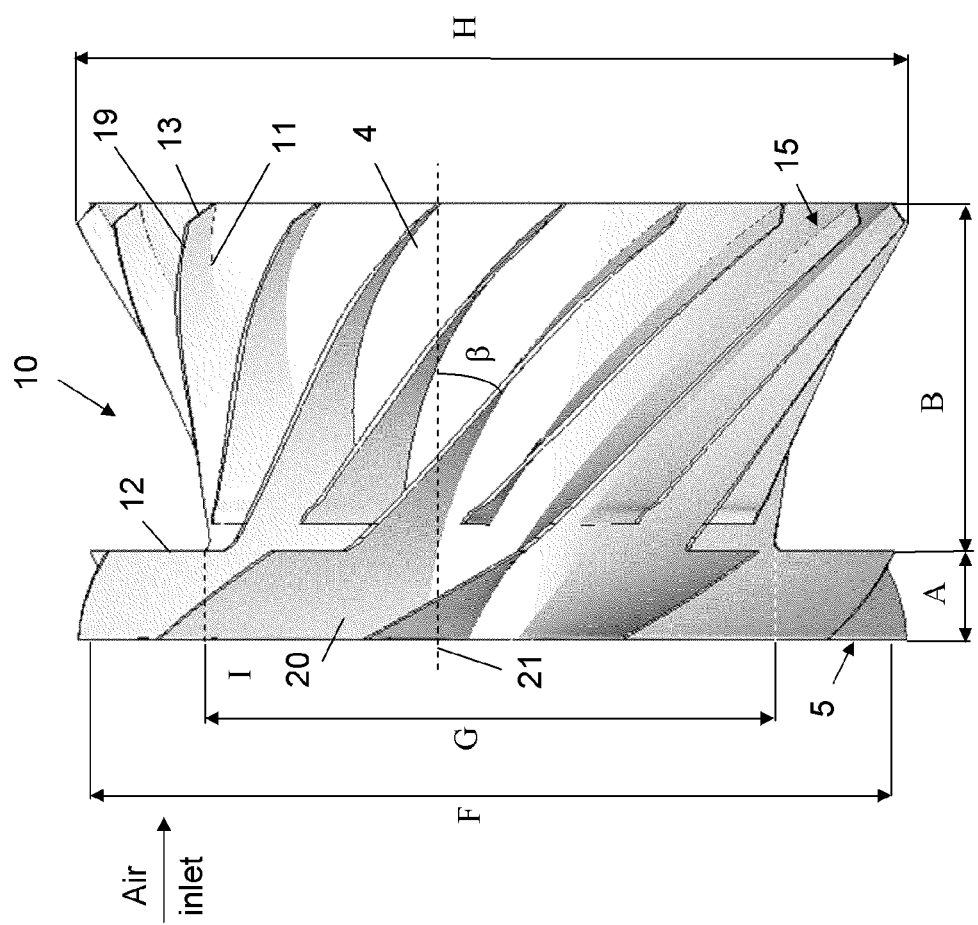
FIG. 1 is a side view of a combined impeller, according to one embodiment of the present invention.

As shown in the side view of FIG. 1, single shaft, one-piece impeller 10 comprises a fan blade section 5 at the inlet side I and a mixed-flow compressor blade section 15 at the impeller outlet side O, all of which extending outwardly from central hub 4. The axial length A of fan blade section 5 is less than, e.g. approximately one-third, the axial length B of compressor blade section 15. The outer diameter F of the fan section 5 is significantly greater, e.g. approximately 25% greater, than the outer diameter G of the inlet of compressor section 15, although the tip blade diameter of compressor section 15 progressively increases in size to the outside diameter of H at its compressor end which is approximately equal to the outside diameter F of fan section 5. Fan section 5 pressurizes the axially entering inlet air up to 1.5-2.5 times by rotation of its blades. A bypassed portion of the pressurized air is discharged through the fan trailing edge 12 outwardly into a bypass duct (not shown in FIG. 1) for producing additional thrust or for other needs of compressed air, such as air conditioning. The remaining portion of the compressed air is admitted to compressor section 15 while flowing through a channel CH (FIG. 4) and is additionally compressed 3-6 times by the compressor blades 20. Air is discharged from compressor section 15 through the compressor trailing edge 13 of impeller 10. Since air is guided through the continuous and aerodynamically smooth channels, stator vanes between the fan and compressor sections are rendered unnecessary.

Figure 2:
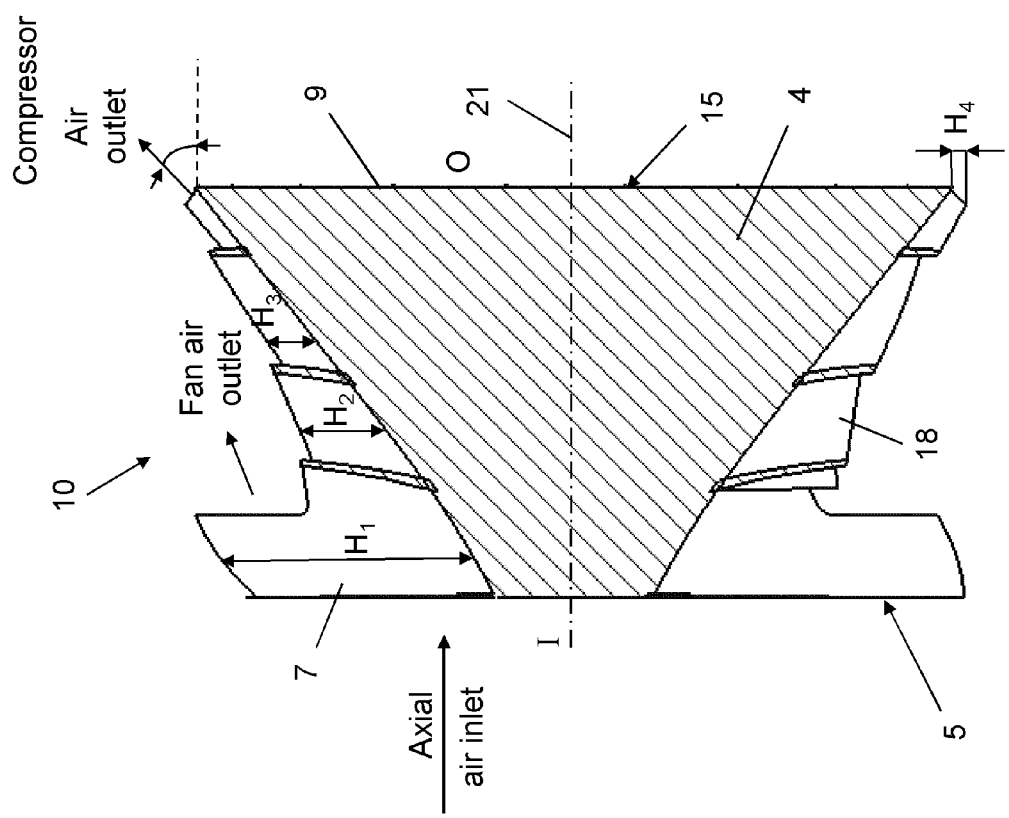
FIG. 2 is a cross sectional view of the impeller of FIG. 1.

As shown in the cross-sectional view of FIG. 2, such a configuration of fan blade section 5 and compressor blade section 15 is made possible by the bell shape, i.e. a continuously increasing diameter, of solid hub 4, which is of a circular cross section. The configuration of each blade which comprises integral fan and compressor portions complements the shape of hub 4. That is, the blade height $H_1$ of fan blade portion 7 from the hub 4, i.e. measured perpendicularly to axis 21, which has a relatively small hub diameter at inlet I, is significantly greater than the blade height $H_2$ of each compressor blade portion 18. The blade height of compressor blade portion 18 from hub 4 is progressively reduced from $H_2$ to $H_4$, as shown in FIG. 2, while the diameter of hub 4 progressively increases. At outlet end O of impeller 10, hub 4 terminates with a planar surface 9, which is substantially perpendicular to axis 21, or with a non-planar surface the shape of which is suitably designed for providing the needed strength and stiffness for the single fan-compressor wheel.

Figure 3:
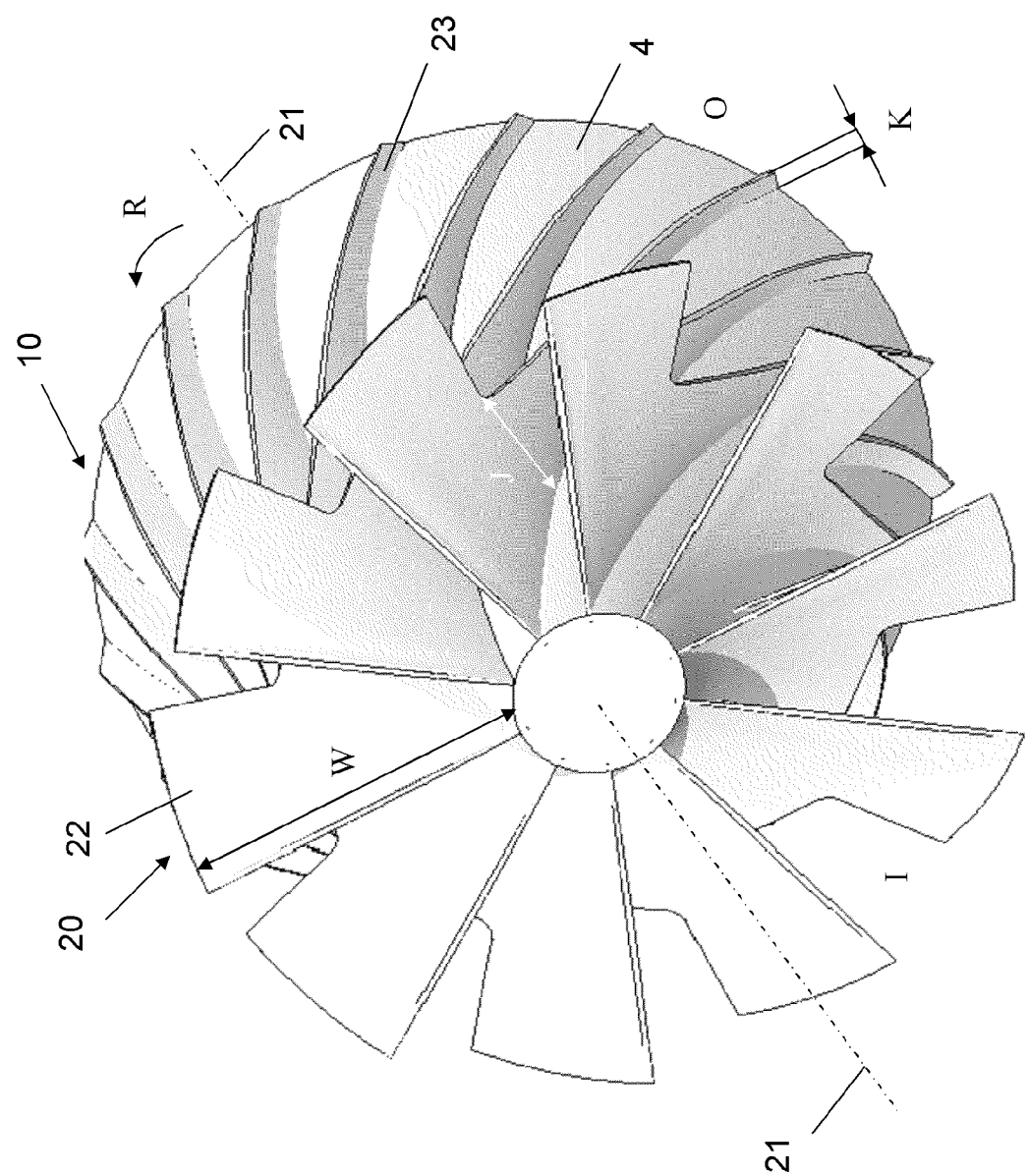
FIG. 3 is a perspective view from the inlet end of the impeller of FIG. 1.
Figure 4:
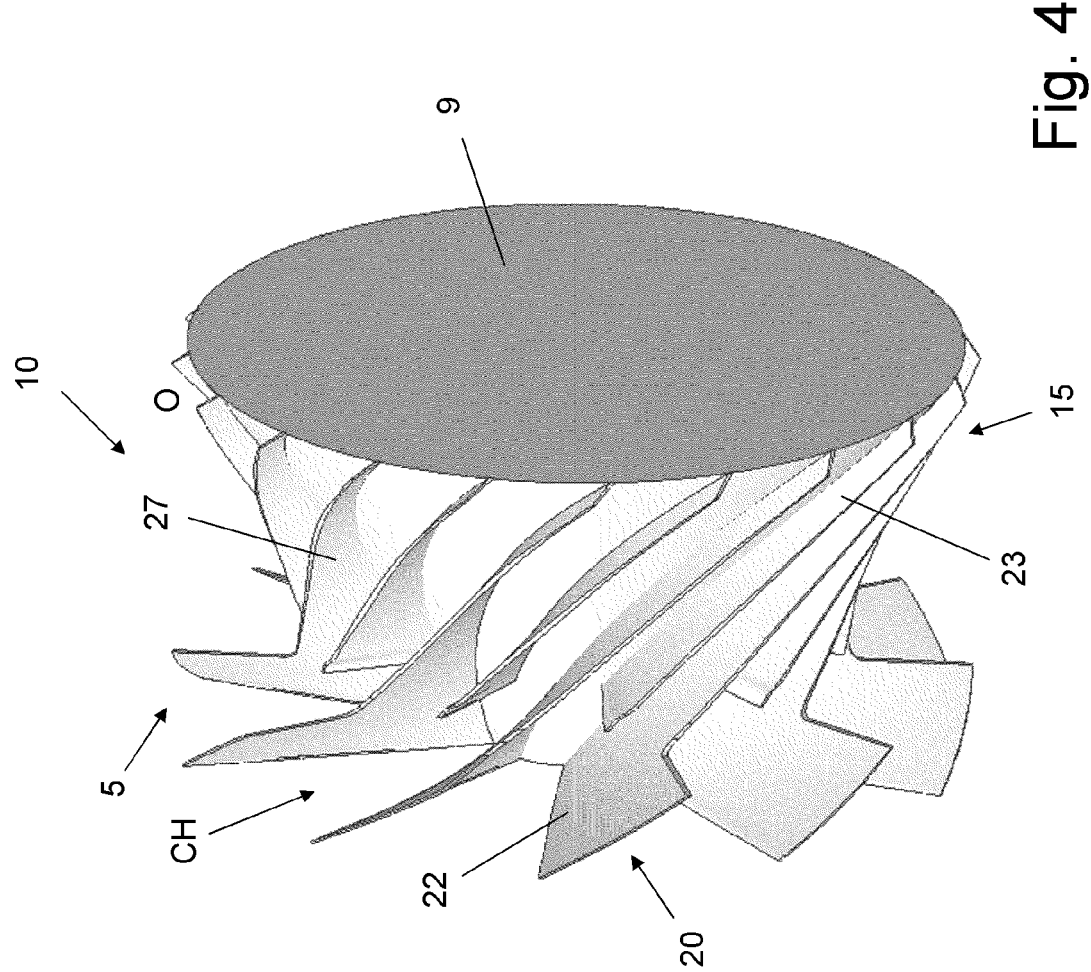
FIG. 4 is a perspective view from the side and rear of the impeller of FIG. 1, showing a plurality of air passage channels each of which defined by two adjacent main blades.

FIGS. 3-4 illustrate two different perspective views, respectively of impeller 10. The hub 4 and blades are preferably integrally made from a single piece of metal, such as by 5-axis CNC machining by metal cutting, or by a casting procedure, such as the "investment casting" method or the "lost-wax" method, as well known to those skilled in the art, although it is in the scope of the invention that the blades are connected to the hub. The cost to manufacture the single fan-compressor wheel of the present invention is considerably less than that to separately manufacture the fan, guide vanes, and impeller of the compressor.

Referring now to FIG. 3, impeller 10 comprises a plurality of mixed-flow curvilinear blades 20 for urging the pressurized air in a diagonal air path relative to the axis of rotation 21 after having been introduced to axial inlet I, the number of which generally ranging between 6 and 36. Each mixed-flow blade 20 is made from a single piece of metal, e.g. titanium, extending along the hub 4 with which it abuts from inlet end I to outlet end O, and comprises a relatively wide and curvilinear trapezoidal fan portion 22 having a height W from the hub at inlet end I and an elongated compressor portion 23 at outlet end O. Compressor portion 23 tapers from a height J, which is approximately 50% of height W, at its inlet end to a height K, which is approximately 15% of height J, at its outlet end. The values of W, K and K depend on the pressure ratio and the bypass ratio, i.e. the ratio of the bypass flow rate to the compressor flow rate, of impeller 10. Both fan portion 22 and compressor portion 23 of each blade 20 are positioned at three-dimensional angles with respect to impeller axis 21 to form the combined one-piece, continuous mixed-flow blade. This mixed-flow blade shape is defined by the combination of an interface line 11 (FIG. 1) between blade 20 and the hub 4 which is initially substantially axially extending and is then oriented diagonally relative to axis of rotation 21, and a three-dimensional blade profile having a variable blade angle β (FIG. 1) between the blade surface and axis of rotation 21. The actual selected shape of blade 20 is dependent on aerodynamic considerations, to prevent separation of the introduced airstream from the blade surfaces, and on strength considerations, which include, among others, the safety margins of stresses within the blade. Blade 20 need not be of uniform thickness, as the thickness thereof may vary along different regions of the hub as a result of the strength and aerodynamics considerations, well known to those skilled in the art, The set of identical blades 20 is substantially axisymmetric with respect to axis of rotation 21 of impeller 10. Each blade 20 has a twisted configuration to ensure a suitable angle of attack at each blade curvature. That is, at inlet I the blade is sloped in the direction of rotation R and at the outlet O of the compressor portion 23 the blade is sloped against the direction of rotation R, i.e. a so-called backswept blade configuration. The angle β of hub line 11 and outer blade edge 19 (FIG. 1) with respect to axis of rotation 21 continuously changes, from an angle of approximately 30-60 degrees at inlet I to an angle of approximately 15-60 degrees at compressor end O.

FIG. 4 illustrates the different orientation of fan portion 22 of section 5 and compressor portion 23 of section 15. Section 15 terminates at compressor end 9 of the hub.

The interspace between the plurality of blades 20 that impeller 10 provides is also illustrated. The interspace between two adjacent blades 20 defines a diagonal channel CH along which the pressurized air is directed from inlet I to compressor end O. If so desired, one or more portions of channels CH may be divided by a splitter blade 27 between two adjacent main blades 20.

Since each blade 20 continuously extends from fan section 5 to compressor section 15, there is no need to provide stator blades to direct air from the fan portion to the compressor portion of the impeller, as has been customary heretofore in prior art impellers, thereby significantly reducing the manufacturing costs.

Since blades 20 are of the mixed-flow type, the diameter of the combined fan-compressor impeller 10 is significantly less than of prior art centrifugal impellers that have a separated fan and compressor.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A combined fan-compressor impeller, comprising a single hub and a plurality of spaced main blades extending outwardly from said hub, an air passage channel being defined between two of said main blades, wherein each of said main blades is a mixed flow blade which continuously extends from a fan section at an inlet end of a channel to a compressor section at an outlet end of said channel without any axial clearance between said fan section and said compressor section, thereby providing aerodynamic matching of pressurized air flowing through said channel from said fan section to said compressor section, and which is configured with an interface line at a hub-blade interface that has a smaller angle relative to an axis of rotation adjacent to said inlet end than in a direction towards said outlet end, and with a three-dimensional blade profile having a variable blade angle between a blade surface and said axis of rotation.

2. The impeller according to claim 1, wherein the main blade comprises a fan portion and an elongated compressor portion having a blade height from the hub which is significantly less than that of said fan portion.

3. The impeller according to claim 2, wherein one portion of pressurized air exits the impeller via a first outlet from a trailing edge of the fan portion leading to a bypass duct.

4. The impeller according to claim 3, wherein another portion of pressurized air exits the impeller via a second outlet through a compressor section end of the channel.

5. The impeller according to claim 1, further comprising one or more splitter blades, each of said splitter blades extending outwardly from the hub and positioned between two adjacent main blades.

6. The impeller according to claim 1, wherein an outlet end of the fan section has an outer diameter significantly greater than the outer diameter of an inlet end of the compressor section.

7. The impeller according to claim 5, wherein We hub and the plurality of main blades and splitter blades are integrally made from a single piece of metal.

8. The impeller according to claim 5, wherein the hub and the plurality of main blades and splitter blades are made from two or more parts.

9. The impeller according to claim 1, wherein the blade profile is of a backswept blade configuration.

10. The impeller according to claim 2, wherein the blade height of the compressor portion is progressively reduced in a direction towards the outlet end while the diameter of the hub progressively increases.

11. The impeller according to claim 10, wherein the fan portion is trapezoidal and the blade height at the inlet end of the compressor portion is approximately 50% of the blade height at the inlet end of the fan portion.

12. The impeller according to claim 1, wherein an axial length of the fan section is less than the axial length of the compressor section.

* * * * *